United States Patent [19]

Brucato et al.

[11] 4,056,898
[45] Nov. 8, 1977

[54] WATER ACTUATED PLANT FERTILIZING DEVICE

[76] Inventors: Jacqueline I. Brucato; Steve J. Brucato, both of 3712 Downers Drive, Downers Grove, Ill. 60515

[21] Appl. No.: 684,926

[22] Filed: May 10, 1976

[51] Int. Cl.² ............................................. A01G 29/00
[52] U.S. Cl. .................................. 47/48.5; 47/DIG. 4
[58] Field of Search ................. 47/9, 24, 25, 33, 48.5, 47/DIG. 4

[56] References Cited

U.S. PATENT DOCUMENTS

| | | | |
|---|---|---|---|
| 1,992,878 | 2/1935 | Muller | 47/38.1 |
| 2,145,934 | 2/1939 | Kingman | 47/48.5 X |
| 2,375,860 | 5/1945 | Markham | 47/48.5 |
| 2,713,752 | 7/1955 | Sobol | 47/38.1 |
| 3,005,287 | 10/1961 | Dudley | 47/48.5 X |
| 3,755,966 | 9/1973 | Smith | 47/48.5 |
| 3,857,195 | 12/1974 | Johnson | 47/9 X |

*Primary Examiner*—Edgar S. Burr
*Assistant Examiner*—James R. Feyrer
*Attorney, Agent, or Firm*—Robert E. Wagner; Gerald T. Shekleton

[57] ABSTRACT

A fertilizer container for releasing nutrients to plants over a prolonged period of time including a receptacle having upper and lower reservoir separated by a porous plate. The lower reservoir contains fertilizer in a time-delay form which is slowly released upon contact with water seeping through the porous plate from the upper reservoir. The dissolved fertilizer then seeps through the porous lower reservoir and into the soil surrounding a plant.

4 Claims, 4 Drawing Figures

WATER ACTUATED PLANT FERTILIZING DEVICE

This invention relates to a fertilizing means for house plants, and in particular, to an automatic house plant fertilizing cup.

BACKGROUND OF THE INVENTION

Various means have been employed by the prior art in endeavoring to achieve a controlled time release fertilizer for individual plants, especially in the house plant market. House plants present two related problems in the area of fertilization; a grower may either overfertilize or underfertilize. The causes of underfertilization usually reside in forgetfulness or a lack of awareness as to the plight of the plant. Overfertilization generally results from the opposite end of the spectrum, i.e., overattentiveness. As in watering, one can overfertilize a plant to the point where the soil conditions are not conducive to plant growth. As in the case of underfertilization, the plant will wither and die unless measures are taken to combat these conditions.

In an effort to solve the problems associated with various growers' neglect or overattentiveness, as the case may be, several time-delay fertilizers have become available. These time-delay fertilizers are generally in an encapsulated form or a slowly dissolving type. Both of these forms are sprinkled on the soil surface or mixed with the soil directly. Due to the nature of this type of fertilizer and the natural inquisitiveness of children and pets, they suffer from the parental objection that a child or pet might find this fertilizer appealing and ingest it.

Other attempts by the prior art at a slow release fertilizing apparatus include water soluble fertilizer soaked in wads of a fibrous material such as a sponge and held in a spike-like container for insertion into the ground as disclosed in U.S. Pat. No. 2,145,934. The nutrients then would leach into the surrounding soil. This device was also found wanting since it was, in effect, not adaptable for use with house plants as it had a tendency to disturb the roots of the plant upon its insertion.

Therefore an object of the subject invention is a controlled release house plant fertilizing apparatus which will release fertilizer into the soil surrounding a plant at a controlled rate simply by watering the plant.

Also an object of the subject invention is a means for containing a slow release fertilizer in a covered cup for easy and safe handling.

A further object of the subject invention is a house plant fertilizing cup which will release fertilizer over a prolonged period of time and in sequence with the watering cycle.

These and other objects are attained in accordance with the present invention wherein there is provided a container which may be variably sized according to the size and needs of the plant to be fertilized. The container includes two levels, each level being separated by a porous or perforated material. The upper portion or reservoir of the container is for the temporary collection of water. The lower portion or reservoir contains a slow release or time-delay fertilizer and inert filler material, if desired. The bottom of the container is also porous or perforated. When assembled and filled with fertilizer in the lower portion, the fertilizer cup is placed on the ground near the plant. If a house plant is being fertilized, the fertilizer cup is placed within the pot on the soil. In all cases, the fertilizer cup is placed at least 1 to 2 inches from the main stem of the plant. Upon watering the plant, the upper reservoir of the fertilizer cup will collect water and allow it to slowly seep through the fertilizer or lower reservoir. The water will leach a small amount of fertilizer from this lower reservoir and pass through the perforated base into the soil. In this manner, as long as the plant receives adequate water, the desired amount of fertilizer will also be released to the roots of the plant.

In one embodiment of the invention, the plate is sealed into the cup after filling the lower portion with the desired amount of fertilizer and filler. In this manner, even though the container may be overturned by inquisitive animals, such as dogs, etc., or by inquisitive children, or by a gust of wind, its contents will not be spilled. Thus, the toxic fertilizers will not harm anyone or anything by being so scattered. This method of assembly also allows for a more secure and safer transport and reduces problems pertaining to packaging and storage.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein:

Referring now to FIG. 3, the fertilizing container 10 of the subject invention can be seen to be a cup-like apparatus which, as shown in FIG. 3, may have scalloped sides 50 for decorative purposes, however, such scalloped sides are not necessary and other configurations such as a smooth exterior or decorations in a different fashion may be employed.

FIG. 4 shows a cross section of the fertilizing cup 10 taken about its mid-section. As can be seen, the fertilizing cup 10 is divided into two separate receptacles: an upper reservoir 25, which is used for the temporary retention of water, and a lower reservoir 30, which contains a fertilizer 31 in a time-delayed form such as a microencapsulated fertilizer having a plastic covering or other suitable means by which the fertilizer may be released at a controlled rate.

Figure 1:
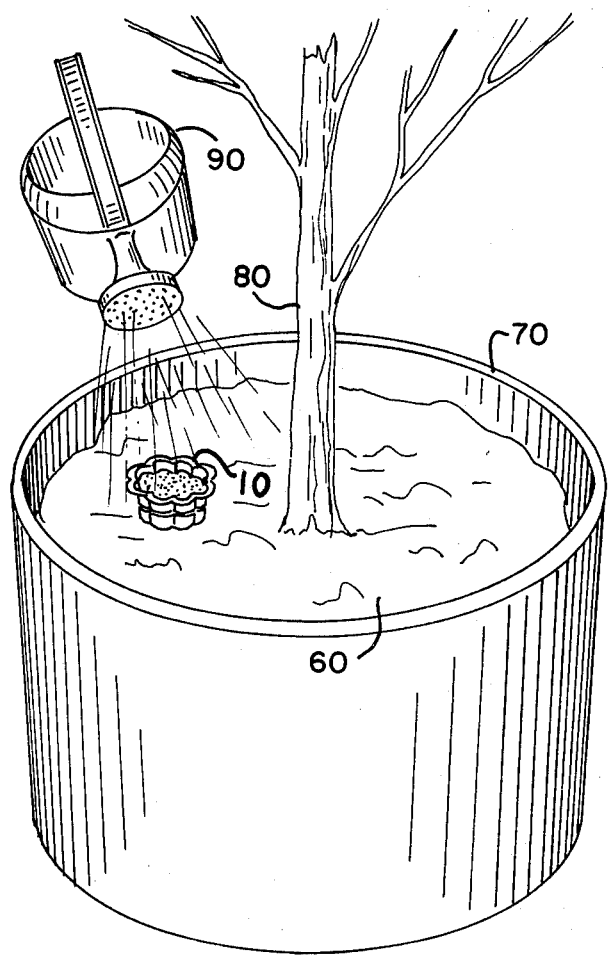
FIG. 1 shows the subject invention in its intended use for fertilizing a plant.

The lower reservoir 30 has a raised frustoconical base or central upstanding portion 45, thus forming the lower reservoir 30 of the preferred embodiment into a donut-like shape. However, it should be realized that the subject invention is not limited to the circular shape of the fertilizer cup 10 shown, but shall include any appropriate shape. Thus, were a rectangular shape to be used, the central uplifted portion 45 would remain, though in a corresponding rectangular or other suitable shape.

Shoulder 35 is provided on the interior periphery of the tapered walls 50 of the fertilizer cup 10. This shoulder provides a support or stop for a panel or cover 15 which serves to separate the upper reservoir 25 and the lower reservoir 30. This shoulder 35 might be formed by a shoulder either continuous or discontinuous between the upper and lower reservoirs. Under such circumstances, the lower reservoir 30 may be slightly smaller in diameter than the upper reservoir 25. In so separating the two reservoirs, the cover retains the fertilizer 31 within the lower compartment. Aiding the shoulder 35 in the support of the cover 15, is the top surface 40 of the central upraised portion 45. This top surface 40 is formed at the same level as the shoulder 35.

Figure 2:
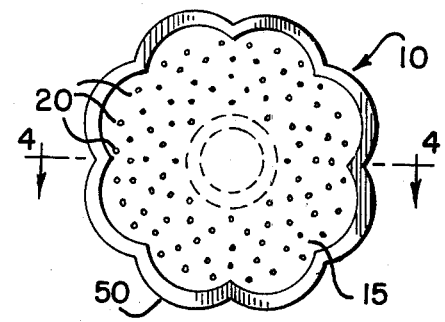
FIG. 2 shows a top view of an embodiment of the subject invention.
Figure 3:
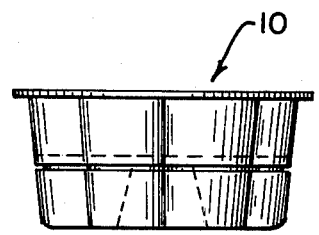
FIG. 3 shows a side view of an embodiment of the subject invention.
Figure 4:
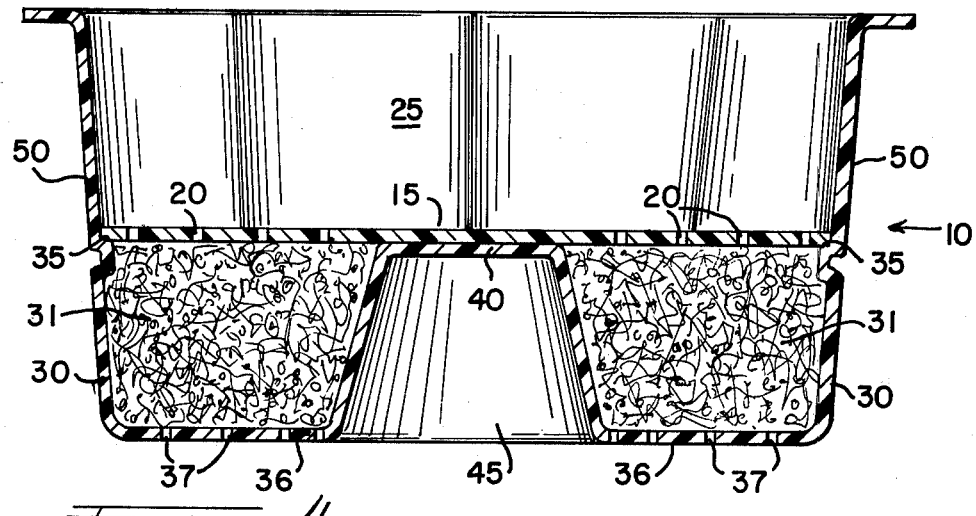
FIG. 4 shows a cross section of an embodiment of the subject invention taken along the line 4—4 of FIG. 2.

The top or cover portion 15, as shown in FIG. 2, has a scalloped periphery and is uniformly perforated with a multitude of small openings. The bottom 36 of the fertilizing cup 10 includes similar perforations 37. In the alternative, the cover 15 and the bottom 36 might be formed of a suitably porous material such as fritted glass, ceramic or heavy fabric. The fertilizer is thus introduced into the cup 10 and the cover portion 15 is pressed or sealed shut by appropriate means, to form a unitary, safe and clean apparatus for fertilization.

When in use, as shown in FIG. 1, the fertilizing cup of the subject invention rests on the soil 60 in close proximity to the plant 80. As shown in FIG. 1, the plant 80 may be in a pot 70, however, the subject invention 10 is intended to be used for both potted plants and outdoor unpotted plants. When in place near the plant 80, as shown in FIG. 1, the subject invention 10 will release the nutrients of the fertilizer 31 to the soil at 60 and thence to the roots of the plant 80. This release of nutrients occurs in timed relationship with the watering of the plant, as depicted by the watering can 90. When the plant is so watered, some of the water is collected within the upper reservoir 25 of the fertilizing cup 10, the water thereby collected slowly seeping or filtering through the perforations 20 of the cover 15 into the lower reservoir 30, thereby dissolving or leaching a part of the nutrients from the time-delay fertilizer 31 and carrying these dissolved nutrients through the perforations 37 of the bottom 36 of the fertilizing cup 10 onto the soil 60 supporting the cup giving nourishment to the plant.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A fertilizer container for placement on the surface of the soil in close proximity to the root system of a plant, comprising, in combination, a cup having outer walls, a porous bottom, said outer walls tapering inwardly toward said bottom, the central portion of said porous bottom portion being a raised broad upper support surface, an interior shoulder on a midsection of said outer walls, a flat substantially uniformly perforated cover plate, said cover plate having a periphery positionable on said interior shoulder and substantially conforming to said outer wall, said raised upper support surface supporting a substantial portion of said cover plate and said shoulder supporting said periphery of said cover plate thereby providing a broad support base for said cover plate and separating said cup into a lower compartment and an upper compartment, said lower compartment being substantially donut-shaped and said upper compartment being for the reception of water, whereby the water received in said upper compartment may seep uniformly into said lower compartment, where at least a portion of said fertilizer is dissolved and passes, through said porous bottom onto the soil supporting the container at a controlled rate.

2. The fertilizer container of claim 1 wherein said container is formed of a plastic for easy manufacture.

3. The fertilizer container of claim 1 wherein the outer walls of said cup are scalloped.

4. The fertilizer container of claim 3 wherein the bottom portion includes a central upraised substantially frustoconical portion supporting said upper support surface.

* * * * *